US008209304B2

(12) United States Patent
Petri

(10) Patent No.: US 8,209,304 B2
(45) Date of Patent: Jun. 26, 2012

(54) INDICATING STALENESS OF ELEMENTS IN A DOCUMENT IN A CONTENT MANAGEMENT SYSTEM

(75) Inventor: John Edward Petri, Lewiston, MN (US)

(73) Assignee: International Business Machines Corporation, Armonk, NY (US)

( * ) Notice: Subject to any disclaimer, the term of this patent is extended or adjusted under 35 U.S.C. 154(b) by 676 days.

(21) Appl. No.: 11/930,272

(22) Filed: Oct. 31, 2007

(65) Prior Publication Data

US 2009/0112938 A1 Apr. 30, 2009

(51) Int. Cl.
*G06F 17/30* (2006.01)
*G06F 7/76* (2006.01)
(52) U.S. Cl. ........................................ 707/694
(58) Field of Classification Search .......... 707/751, 707/754, 749, 694
See application file for complete search history.

(56) References Cited

U.S. PATENT DOCUMENTS

| | | | | |
|---|---|---|---|---|
| 6,622,125 | B1* | 9/2003 | Cragun et al. ............ | 705/14.52 |
| 2002/0087600 | A1* | 7/2002 | Newbold ..................... | 707/514 |
| 2003/0061221 | A1* | 3/2003 | Ito et al. ....................... | 707/100 |
| 2005/0080804 | A1* | 4/2005 | Bradshaw et al. ............ | 707/102 |
| 2005/0192957 | A1* | 9/2005 | Newbold ....................... | 707/5 |
| 2005/0240580 | A1* | 10/2005 | Zamir et al. ................... | 707/4 |
| 2006/0080314 | A1* | 4/2006 | Hubert et al. ................. | 707/5 |
| 2006/0259461 | A1* | 11/2006 | Kapur .............................. | 707/2 |
| 2007/0136663 | A1* | 6/2007 | Grigoriadis et al. ......... | 715/530 |
| 2008/0010588 | A1* | 1/2008 | Wake et al. .................... | 715/234 |
| 2008/0109808 | A1* | 5/2008 | Wing et al. .................... | 718/102 |
| 2008/0301010 | A1* | 12/2008 | Klim et al. ..................... | 705/28 |
| 2009/0083613 | A1* | 3/2009 | Davis ............................ | 715/212 |

FOREIGN PATENT DOCUMENTS

CN 1488109 A 4/2004

OTHER PUBLICATIONS

"Revised Framework for Integration of Electronic Document Management Systems and Electronic Records Management Systmes", Nov. 6, 2006, AIIM.*
Magrans de Abril et al. "Enhancing the User Interface of the CMS Level 1 Trigger Online Software with AJAX", May 2007, CERN.*
"Calculating the Value of Software as a Service to Your Organization", Oct. 2006, Astoria.*
Web page at http://www.ptc.com/appserver/mkt/products/home.jsp?k=3591, Oct. 30, 2007.
Web page at http://www.invisionresearch.com/products/xpress/, Oct. 30, 2007.

* cited by examiner

*Primary Examiner* — Jacob F Bétit
*Assistant Examiner* — Sheryl Holland
(74) *Attorney, Agent, or Firm* — Martin & Associates LLC; Derek P. Martin

(57) ABSTRACT

A content management system (CMS) indicates stale (i.e. outdated) elements in a document according to a stale content policy that specifies one or more thresholds that determine whether or not an element is stale, and if a stale element should trigger an auto suggest mechanism. When an author checks a document out of the repository, the elements in the document are displayed to the user to indicate the element's staleness according to the stale content policy. The auto suggest mechanism populates a related elements list via a query to the repository according to an auto suggest policy that specifies which elements can be included by the auto suggest mechanism in the related elements list. The related elements list is presented to a user, who may select one of the related elements. The link in the document to the stale element is replaced by a link to the selected related element.

13 Claims, 7 Drawing Sheets

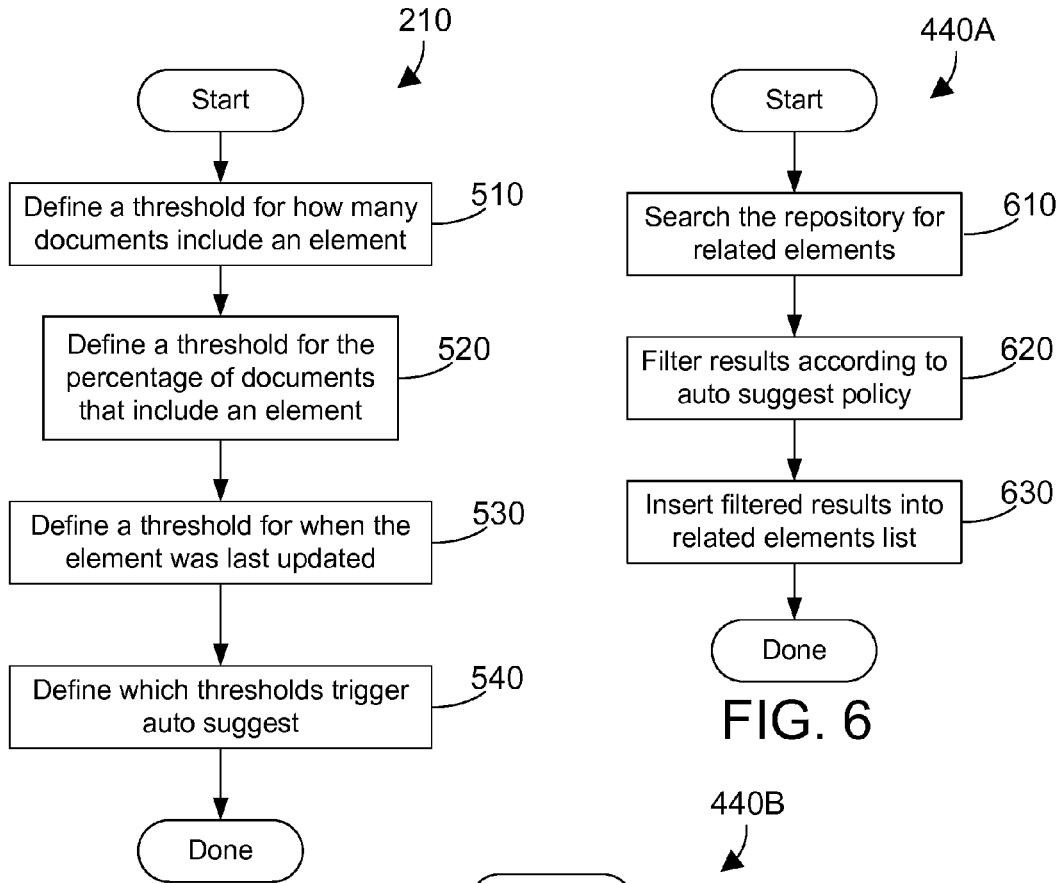
FIG. 5
FIG. 6
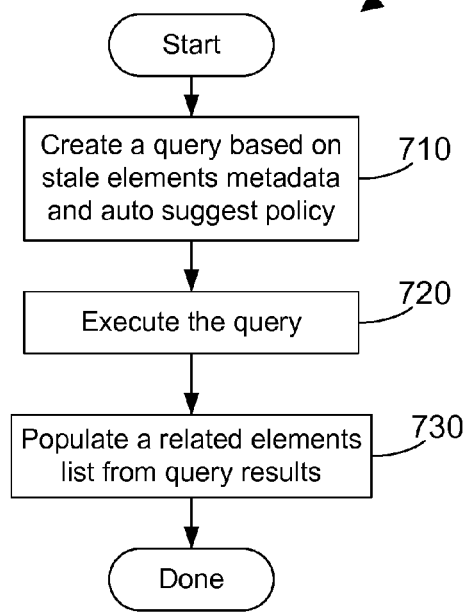
FIG. 7

```
select documents where doctype = 'labeling_chunk' AND
subtype = 'Final Labeling' AND
parent_ref_count > 5 AND
parent_reuse_percentage >= 0
```

INDICATING STALENESS OF ELEMENTS IN A DOCUMENT IN A CONTENT MANAGEMENT SYSTEM

BACKGROUND

1. Technical Field

This disclosure generally relates to content management systems, and more specifically relates to content reuse in a content management system.

2. Background Art

A content management system (CMS) allows many users to efficiently share electronic content such as text, audio files, video files, pictures, graphics, etc. Content management systems typically control access to content in a repository. A user may generate content, and when the content is checked into the repository, the content may be subsequently processed by the CMS according to predefined rules. A user may also check out content from the repository, or link to content in the repository while generating content. The rules in a CMS assure that content that comes into or out of the system or that is linked to meets desired criteria specified in the rules.

Known content management systems check their rules when content comes into or out of the repository. If a rule is satisfied, the CMS may perform subsequent processing on the content. Known content management systems may include rules related to bursting, linking, and synchronization. Bursting rules govern how a document is bursted, or broken into individual chunks, when the document is imported or checked into the repository. By bursting a document into chunks, the individual chunks may be potentially reused later by a different author. Linking rules are used for importing and associating objects related to a CMS document based on particular elements or attributes from the document as specified by the rules. For example, an XML document that references external images can take advantage of linking rules so that relationships between the XML content and the external images are automatically created when the document is imported or checked into the repository. Another kind of linking rule governs what content in a repository a user may link to in a document that will be subsequently checked into the repository. Synchronization rules govern synchronization between content and metadata related to the content. For example, a synchronization rule may specify that whenever a specified CMS attribute is changed, a particular piece of XML in the content should be automatically updated with that attribute's value.

When a link is created to a chunk in the repository, the link may use a floating or a fixed relationship. A floating relationship allows the document to always include the latest, or current, version of the chunk referenced by the link. When a change is made to the chunk, and the change becomes the new version, then a floating relationship for the link enables the document to use the new version automatically. A fixed relationship for a link ties the document to a specific version of the chunk. When a change is made to the chunk, and the change becomes the new version, the document does not see the change and continues to link in the old version.

In any case, the user is only aware of the single chunk that is linked into their document, not of similar chunks in the repository that may contain better or more relevant information. For example, a different user may have created a new chunk with updated information instead of updating the existing chunk, in effect outdating the existing chunk. Without a way to indicate to a user that there are outdated elements in a document, users will continue to suffer from including information in their documents that may become or is already outdated.

BRIEF SUMMARY

A content management system (CMS) indicates how stale (i.e. outdated) elements in a document are according to a stale content policy. A stale content policy specifies one or more thresholds that define how the element's metadata should be interpreted to determine the level of staleness of the element, and if the elements should trigger an auto suggest mechanism. When an author checks a document out of the repository, the elements in the document are displayed to the user to indicate the element's staleness according to the stale content policy. For example, these indications make the user aware of elements in the document that may be more outdated than other similar elements in the repository. The stale content policy may trigger an auto suggest mechanism that populates a related elements list via a background query. The auto suggest mechanism functions according to an auto suggest policy that specifies which elements can be included by the auto suggest mechanism in the related elements list. The related elements list is presented to a user, who may select one of the related elements. As a result, the link in the document to the stale element is replaced by a link to the selected related element.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 5 is a flow diagram of one suitable implementation for step 210 in FIG. 2;

FIG. 6 is a flow diagram of a first suitable implementation for step 440 in FIG. 4;

FIG. 7 is a flow diagram of a second suitable implementation for step 440 in FIG. 4;

DETAILED DESCRIPTION

Many known content management systems use extensible markup language (XML) due to its flexibility and power in managing diverse and different types of content. One known content management system that uses XML is Solution for Compliance in a Regulated Environment (SCORE) developed by IBM Corporation. XML is growing in popularity, and is quickly becoming the preferred format for authoring and publishing. While the disclosure herein discusses XML documents as one possible example of content that may be managed by a content management system, the disclosure and claims herein expressly extend to content management systems that do not use XML.

Figure 1:
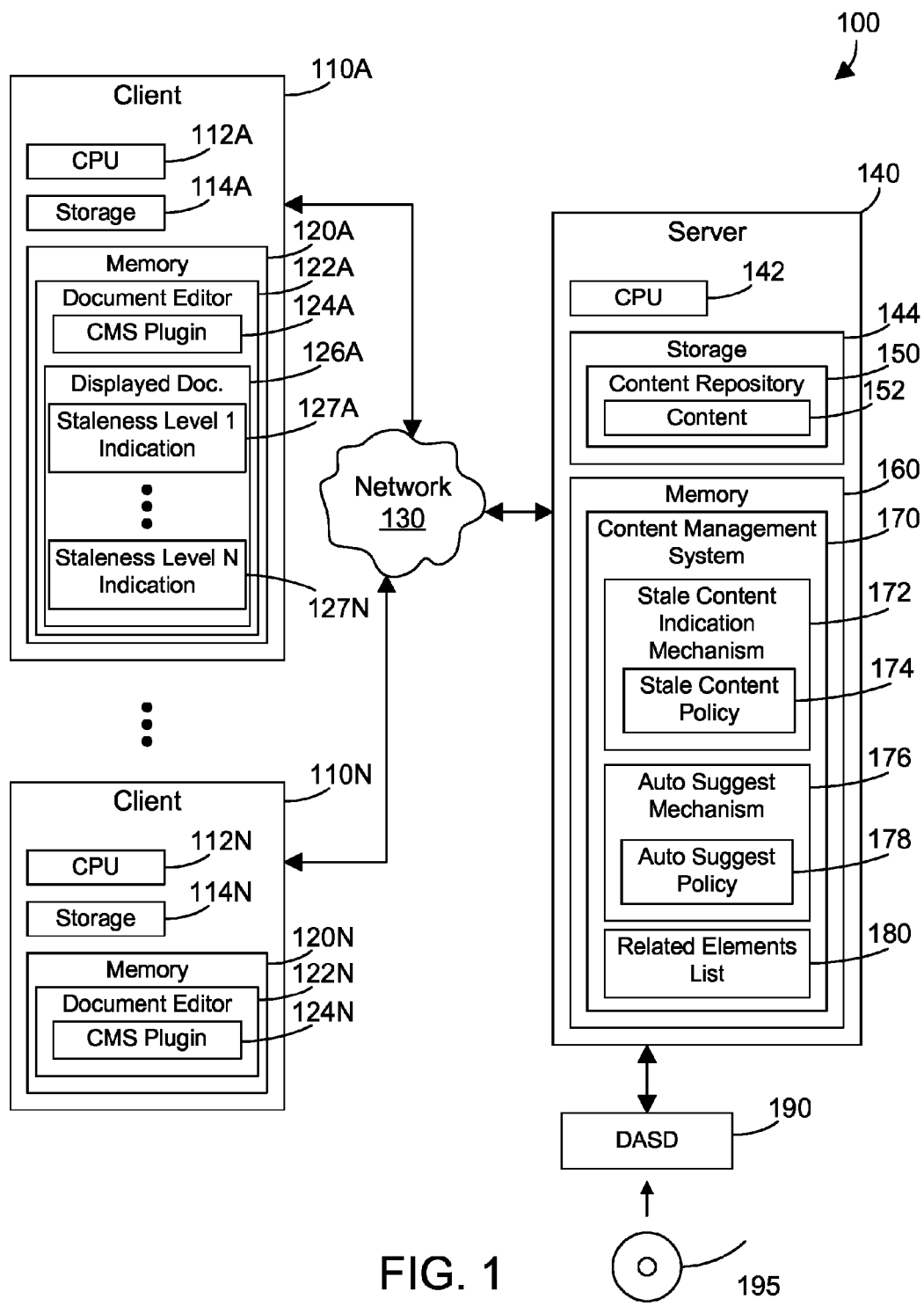
FIG. 1 is a block diagram of a networked computer system that includes a server computer system that has a content management system that includes a stale content indication mechanism that indicates the staleness of elements in a document.

Referring to FIG. 1, networked computer system 100 includes multiple clients, shown in FIG. 1 as clients 110A, . . . , 110N, coupled to a network 130. Each client preferably includes a CPU, storage, and memory that contains a document editor, and a content management system (CMS) plugin. Thus, client 110A includes a CPU 112A, storage 114A, memory 120A, a document editor 122A in the memory 120A that is executed by the CPU 112A, and a CMS plugin 124A that allows the document editor 122A to interact with content 152 in the repository 150 that is managed by the CMS 170 in server 140. In similar fashion, other clients have similar components shown in client 110A, through client 110N, which includes a CPU 112N, storage 114N, memory 120N, a document editor 122N, and a CMS plugin 124N.

A document may be displayed in the document editor 122A in FIG. 1, as shown by displayed document 126A. Displayed document 126A may include any suitable number and types of staleness level indications. For the specific example in FIG. 1, displayed document 126A includes multiple staleness level indications, as shown by staleness level 1 indication 127A through staleness level N indication 127N.

The CMS 170 resides in the main memory 160 of a server computer system 140 that also includes a CPU 142 and storage 144 that includes a content repository 150 that holds content 152 managed by the CMS 170. Content 152 may include one or more documents. As used in the disclosure and claims herein, the term "document" means any type of data that may be managed by a content management system, including all known types of data and objects as well as those developed in the future, and the term "element" means any section or portion of a document that may be individually displayed or accentuated, whether actually in the document or linked to from the document.

One example of a suitable server computer system 140 is an IBM eServer System i computer system. However, those skilled in the art will appreciate that the disclosure herein applies equally to any type of client or server computer systems, regardless of whether each computer system is a complicated multi-user computing apparatus, a single user workstation, or an embedded control system. CMS 170 includes a stale content indication mechanism 172, a stale content policy 174, an auto suggest mechanism 176, an auto suggest policy 178, and a related elements list 180. Stale content indication mechanism 172 provides indications in a document of the staleness of elements in the document. Indications may be any suitable indication to a user, including without limitation visual and audio indications. As used in the disclosure and claims herein, the term "stale" or "staleness" means the level of reusability of a certain element based on thresholds defined in stale content policy 174. Stale content policy 174 defines thresholds for levels of reusability based on an element's metadata. Stale content policy 174 may trigger an auto suggest mechanism 176 to execute a query and make related elements list 180 from the query results. The query parameters are preferably populated from the element's metadata and additional information from auto suggest policy 178. Auto suggest policy 178 defines additional criteria for including elements in related elements list 180.

In FIG. 1, repository 150 is shown separate from content management system 170. In the alternative, repository 150 could be within the content management system 170. Regardless of the location of the repository 150, the content management system 170 controls access to content 152 in the repository 150.

Server computer system 140 may include other features of computer systems that are not shown in FIG. 1 but are well-known in the art. For example, server computer system 140 preferably includes a display interface, a network interface, and a mass storage interface to an external direct access storage device (DASD) 190. The display interface is used to directly connect one or more displays to server computer system 140. These displays, which may be non-intelligent (i.e., dumb) terminals or fully programmable workstations, are used to provide system administrators and users the ability to communicate with server computer system 140. Note, however, that while a display interface is provided to support communication with one or more displays, server computer system 140 does not necessarily require a display, because all needed interaction with users and other processes may occur via the network interface.

The network interface is used to connect the server computer system 140 to multiple other computer systems (e.g., 110A, . . . , 110N) via a network, such as network 130. The network interface and network 130 broadly represent any suitable way to interconnect electronic devices, regardless of whether the network 130 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The mass storage interface is used to connect mass storage devices, such as a direct access storage device 190, to server computer system 140. One specific type of direct access storage device 190 is a readable and writable CD-RW drive, which may store data to and read data from a CD-RW 195.

Main memory 160 preferably contains data and an operating system that are not shown in FIG. 1. A suitable operating system is a multitasking operating system known in the industry as i5/OS; however, those skilled in the art will appreciate that the spirit and scope of this disclosure is not limited to any one operating system. In addition, server computer system 140 utilizes well known virtual addressing mechanisms that allow the programs of server computer system 140 to behave as if they only have access to a large, single storage entity instead of access to multiple, smaller storage entities such as main memory 160, storage 144 and DASD device 190. Therefore, while data, the operating system, and content management system 170 may reside in main memory 160, those skilled in the art will recognize that these items are not necessarily all completely contained in main memory 160 at the same time. It should also be noted that the term "memory" is used herein generically to refer to the entire virtual memory of server computer system 140, and may include the virtual memory of other computer systems coupled to computer system 140.

CPU 142 may be constructed from one or more microprocessors and/or integrated circuits. CPU 142 executes program instructions stored in main memory 160. Main memory 160 stores programs and data that CPU 142 may access. When computer system 140 starts up, CPU 142 initially executes the program instructions that make up the operating system.

Although server computer system 140 is shown to contain only a single CPU, those skilled in the art will appreciate that a content management system 170 may be practiced using a computer system that has multiple CPUs. In addition, the interfaces that are included in server computer system 140 (e.g., display interface, network interface, and DASD interface) preferably each include separate, fully programmed microprocessors that are used to off-load compute-intensive processing from CPU 142. However, those skilled in the art will appreciate that these functions may be performed using I/O adapters as well.

At this point, it is important to note that while the description above is in the context of a fully functional computer system, those skilled in the art will appreciate that the content management system 170 may be distributed as an article of manufacture in a variety of forms, and the claims extend to all suitable types of computer-readable media used to actually carry out the distribution, including recordable media such as floppy disks and CD-RW (e.g., 195 of FIG. 1).

The CMS herein may also be delivered as part of a service engagement with a client corporation, nonprofit organization, government entity, internal organizational structure, or the like. This may include configuring a computer system to perform some or all of the methods described herein, and deploying software, hardware, and web services that implement some or all of the methods described herein. This may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 2:
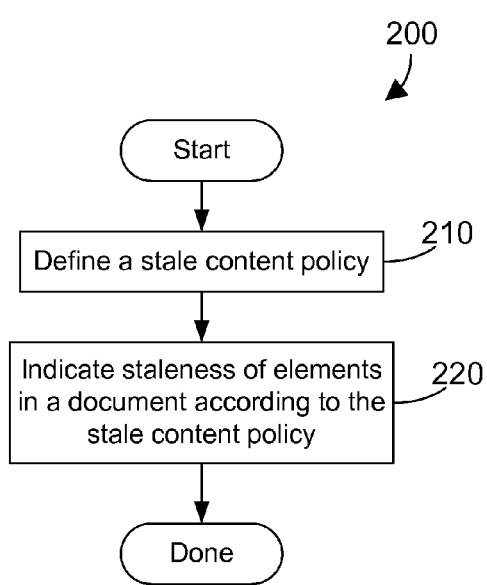
FIG. 2 is a flow diagram of a method for indicating staleness of elements in a document.

Referring to FIG. 2, a method 200 shows the steps for indicating the staleness of elements in a document. First, a stale content policy (e.g., stale content policy 174 in FIG. 1) is defined (step 210). Then a staleness level indication in a displayed document (e.g., displayed document 126A in FIG. 1) is provided according to the stale content policy (step 220) and method 200 is done.

Figure 3:
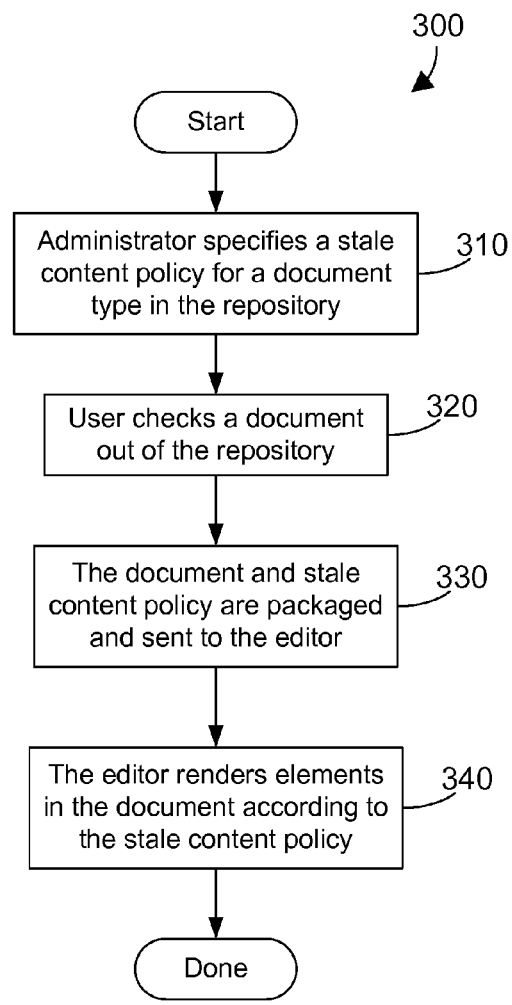
FIG. 3 is a flow diagram of a method for rendering elements in a document to indicate the staleness of the elements.

Referring to FIG. 3, a method 300 begins with an administrator specifying a stale content policy for a document type in the repository (step 310). A user then checks a document out of the repository of the same document type as specified in step 310 (step 320). The document from step 320 and the stale content policy are packaged together and sent to an editor (step 330). The editor then renders elements in the document, including staleness indications, according to the stale content policy (step 340).

Figure 4:
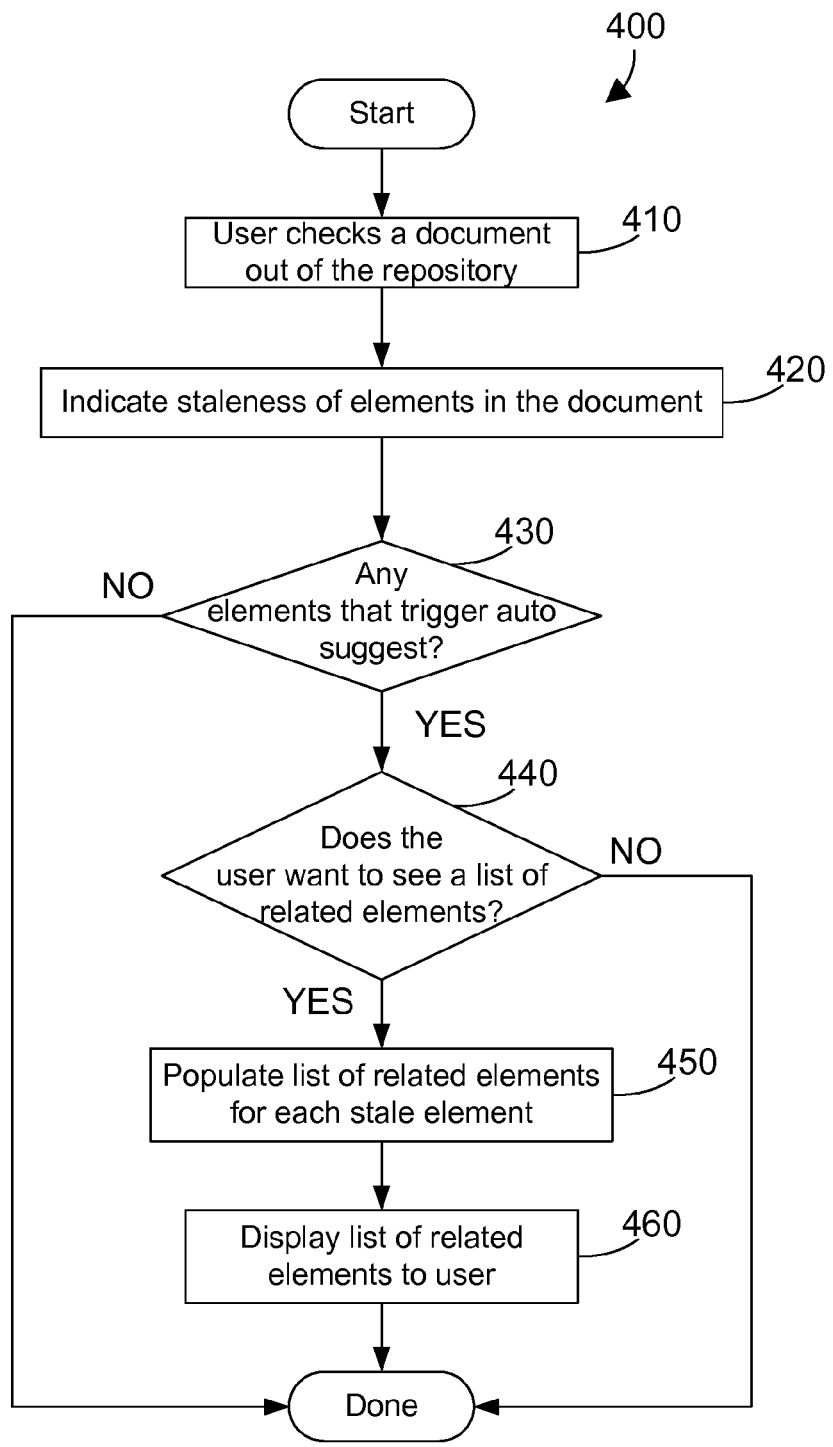
FIG. 4 is a flow diagram of a method for indicating staleness and automatically suggesting which elements to use for stale elements.

Referring to FIG. 4, a method 400 begins with a user checking a document out of the repository (step 410). The staleness level of the elements in the document, according to the stale content policy, is then indicated (step 420). If there are elements in the document that have a staleness level that trigger auto suggest, as defined by the stale content policy (step 430=YES), and if the user wants to see the related elements list (step 440=YES), then a list of related elements is populated for each element that triggered the auto suggest (step 450), and the list of related elements is displayed to the user (step 460). If there are no elements in the document that trigger auto suggest as defined by the stale content policy (step 430=NO), or if the user does not want to see the related elements list (step 450=NO), then method 400 is done.

Referring to FIG. 5, a method 210 showing one suitable implementation for defining a stale content policy (step 210 in FIG. 2) begins by defining a threshold for how many documents include an element (step 510). Then a threshold is defined for the percentage of documents that include an element (step 520), and a threshold is defined for when an element was last updated (step 530). Finally the thresholds that trigger auto suggest are defined (step 540), and method 210 is done. Method 210 shows one suitable implementation for defining a stale content policy. While there are only three types of thresholds defined in the disclosure and claims herein, the disclosure and claims extend to any number and type of thresholds that can be used to evaluate the reusability of elements in a CMS.

Referring to FIG. 6, a method 440A shows one suitable implementation for populating a related elements list (step 440 in FIG. 4). Method 440A begins by searching the repository for related elements (step 610). The results are then filtered according to the auto suggest policy (step 620). The filtered results are then inserted into the related elements list (step 630) and method 440A is done.

Referring to FIG. 7, a method 440B shows another suitable implementation for step 440 in FIG. 4. Method 440B begins by creating a query and populating the query parameters from stale elements metadata and auto suggest policy (step 710). The query is then executed (step 720). The results from the query are then used to populate the related elements list (step 730) and method 440B is done.

Notice that FIGS. 6-7 show suitable implementations for populating a related elements list. Whereas they are specific examples, the disclosure and claims herein extend to any method for populating a related elements list whether currently known or developed in the future.

Figure 8:
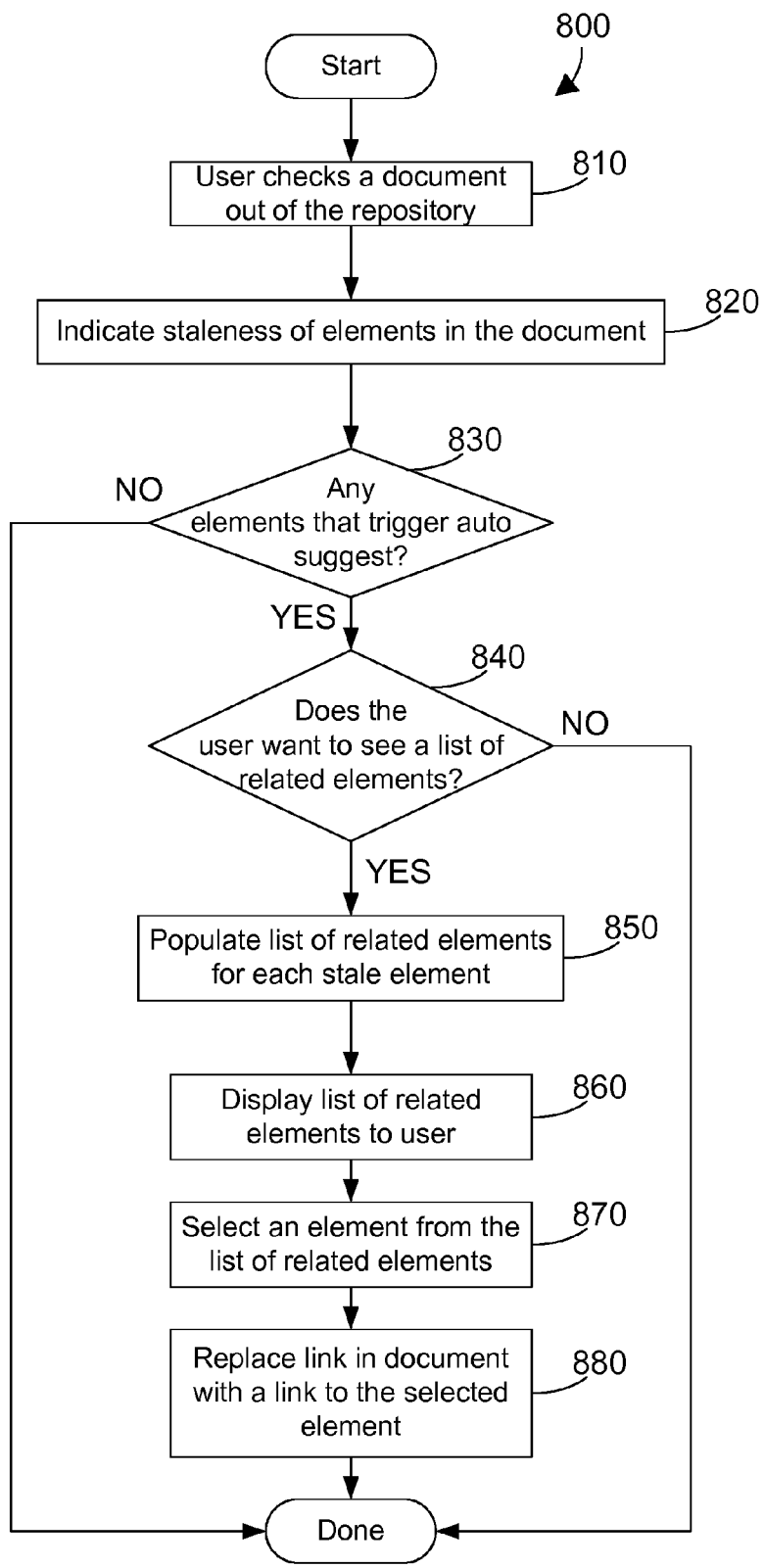
FIG. 8 is a flow diagram of another suitable implementation for indicating staleness and replacing the stale element when the user selects an element from the similar element list.

Referring now to FIG. 8, a method 800 shows a more specific example of method 400 shown in FIG. 4. Method 800 begins with a user checking a document out of the repository (step 810). The staleness level of the elements in the document, according to the stale content policy, is then indicated (step 820). If there are elements in the document that have a staleness level that trigger auto suggest as defined by the stale content policy (step 830=YES), and if the user wants to see the related elements list (step 840=YES), then a list of related elements is populated for each stale element that triggers the auto suggest (step 850), and the list of related elements is displayed to the user (step 860). An element is then selected from the related elements list (step 870). The link to the stale element is then removed from the document and replaced with a link to the element selected in step 870 (step 880) and method 800 is done.

Figure 9:
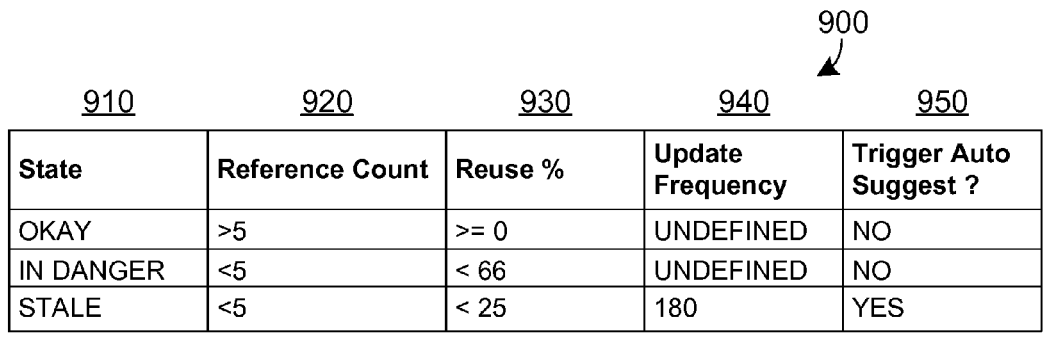
FIG. 9 shows sample stale content policy.

A simple example is now provided to illustrate many of the concepts described above. FIG. 9 shows a sample stale content policy 900, which is one suitable example of stale content policy 174 in FIG. 1. Stale content policy 900 includes a State column 910, a Reference Count column 920, a Reuse Percentage column 930, an Update Frequency column 940, and a Triggers Auto Suggest column 950. State column 910 represents the staleness state that each set of thresholds defines. Stale content policy 900 includes three different staleness states. This is only one implementation, and the disclosure and claims herein extend to any number of staleness states that are defined. Reference Count column 920 indicates a threshold for the number of other documents that include an element for that element to be in the corresponding state. Reuse Percentage column 930 indicates a threshold for the percentage of other documents that include an element. Update Frequency column 940 indicates a time period within which the element must have been updated. For the example herein, the time period is in days. Triggers Auto Suggest column 950 indicates whether or not elements in the corresponding state should trigger auto suggest.

In the example herein, stale content policy 900 defines an element to be considered OKAY if the element has more than 5 other documents that include the element. An element is considered IN DANGER if the element has less than 5 other documents that include the element and is reused by less than 66% of other documents in the repository. An element is considered STALE if the element has less than 5 references to it, it is reused by less than 25% of other documents in the repository, and has not been updated for at least 180 days. Notice that in stale content policy 900, only elements that are STALE will trigger auto suggest. Notice also that while stale content policy 900 shows conditions that are logically ANDed together, the disclosure and claims herein expressly extend to any suitable condition and logical operator.

Figure 10:
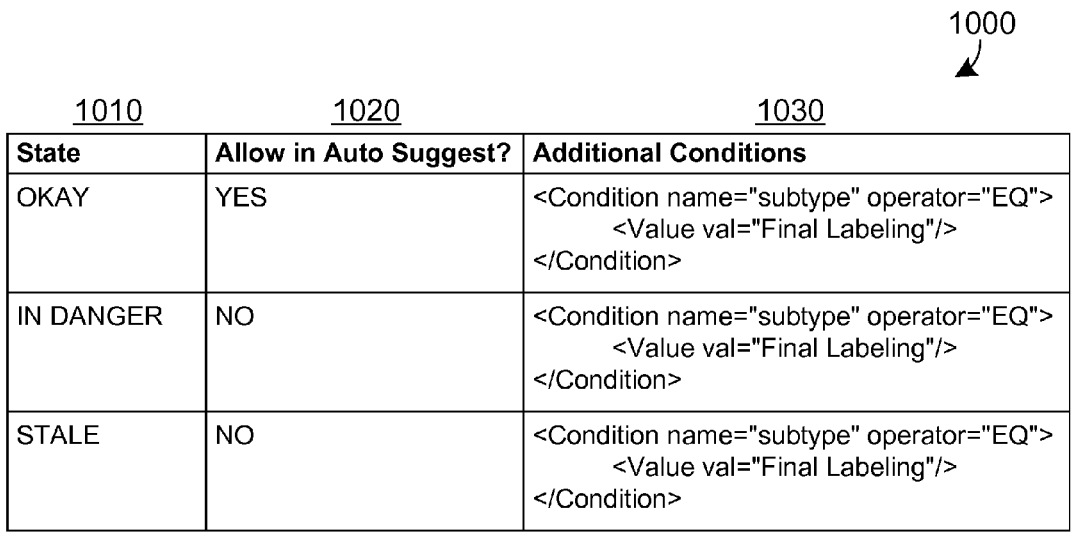
FIG. 10 shows a sample auto suggest policy.

Referring to FIG. 10, auto suggest policy 1000 is one suitable example of auto suggest policy 178 shown in FIG. 1. Auto suggest policy 1000 includes State column 1010, Allow in Auto Suggest column 1020, and Additional Conditions column 1030. State column 1010 represents the staleness state that each set of thresholds defines, and corresponds with State column 910 in stale content policy 900. Allow in Auto Suggest column 1020 indicates whether elements in the corresponding state can appear in a related elements list. Additional Conditions column 1030 indicates additional conditions (i.e. element type, last updated, etc.) that can be defined to further limit the elements that are included in a related elements list. In the example herein, auto suggest policy 1000 defines that only elements with an OKAY state can appear in a related elements list as indicated by column 1020 including a YES value for the row corresponding to the Okay state.

A system administrator defines a stale content policy (step 210 in FIG. 2) by defining a threshold for how many other documents include the element (step 510 in FIG. 5), defining a threshold for the percentage of other documents that include the element (step 520 in FIG. 5), defining a threshold for when the element was last updated (step 530 in FIG. 5), and defining which threshold trigger auto suggest (step 540 in FIG. 5). In the example herein, stale content policy 900 defines an element to be considered OKAY if the element has more than 5 other documents that include the element. An element is considered IN DANGER if the element has less than 5 other documents that include the element and is reused by less than 66% of other documents in the repository. An element is considered STALE if the element has less than 5 references to it, it is reused by less than 25% of other documents in the repository, and has not been updated for at least 180 days. Notice that in stale content policy 900, only elements that are STALE will trigger auto suggest.

A system administrator can then specify an auto suggest policy by defining a threshold for which state can appear in a related elements list, and any additional conditions that a related elements list must satisfy. In the example herein, auto suggest policy 1000 defines that only elements with an OKAY state can appear in a related elements list. Auto suggest policy 1000 also defines additional conditions for subtype of elements appearing in a related elements list.

Figures 11, 12:
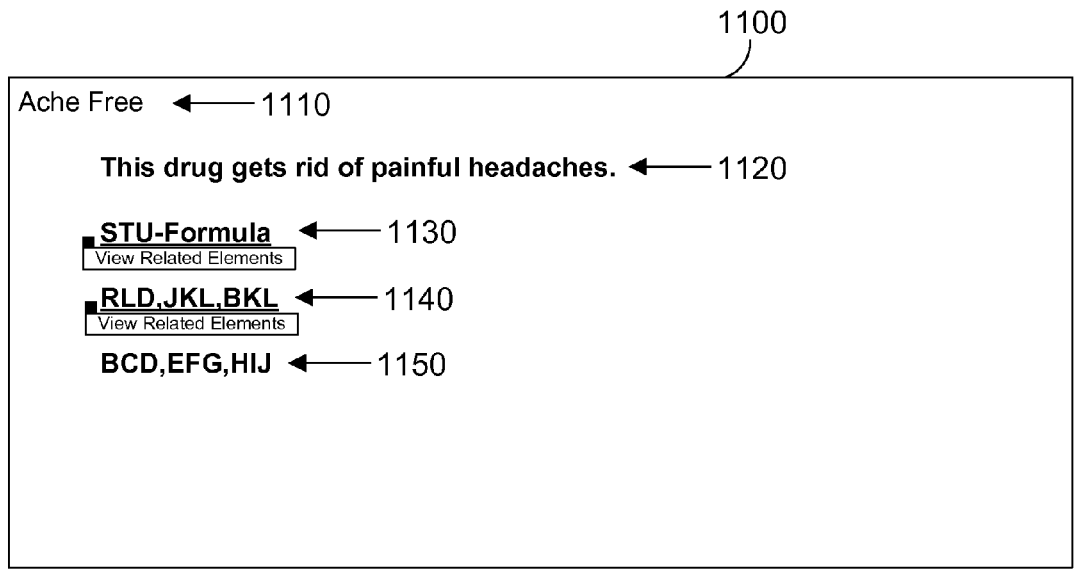
FIG. 11 shows a sample XML document with staleness indications according to stale content policy 900 shown in FIG. 9.
FIG. 12 is a sample query that is executed to populate a list of related elements.

Referring to FIG. 11, document 1100 is an XML document that is in the repository. A user can check document 1100 out of the repository (step 810 in FIG. 8), and the staleness of the elements in document 1100 is then indicated (step 820 in FIG. 8). In FIG. 11, document 1100 shows one element 1110 that has an OKAY staleness level, two elements 1120 and 1150 that have an IN DANGER staleness level, and two elements 1130 and 1140 that have a STALE staleness level. In the current example, elements with an OKAY staleness level are rendered as normal text, elements with an IN DANGER staleness level are rendered in bold text, and elements with a STALE staleness level are rendered in bold, underlined text. Thus as shown in document 1100 in FIG. 11, element 1110 is shown in normal text, elements 1120 and 1150 are shown in bold text, and elements 1130 and 1140 are shown in bold, underlined text. Notice that in the current example, only elements with a STALE staleness level will trigger auto suggest. Document 1100 in FIG. 11 shows elements 1130 and 1140 with buttons to activate dropdown menus to view related elements.

If there are elements in the document that trigger auto suggest (step 830=YES in FIG. 8), then a list of related elements is populated (step 840 in FIG. 8). To populate a list of related elements, a query is created from the STALE element's metadata and the auto suggest policy (step 710 in FIG. 7). A sample query for this example is shown in FIG. 12. The query is then executed (step 720 in FIG. 7) and a related elements list is populated from the results of the query (step 730 in FIG. 7). In auto suggest policy 1000, only elements with an OKAY staleness level can be in a related elements list.

If the user wants to see a list of related elements (step 850=YES in FIG. 8), then the related elements list is displayed to the user (step 860). The user can then select an element from the related elements list (step 870). The link to the STALE element will be removed from the document, and will be replaced with a link to the element selected by the user (step 880 in FIG. 8). In another suitable implementation, a STALE element that is inline in a document can be removed from the document and be replaced with a link to the element selected by the user. In yet another suitable implementation, the STALE element that is inline in a document can be removed from the document and be replaced with the element selected by the user.

The description above assumes a document is analyzed for stale elements each time the document is checked out of the repository. It is equally within the scope of the disclosure and claims herein to process documents in a background process for stale elements, then provide markings in the documents that indicate which elements are stale. This processing could be performed at the request of a user, or at scheduled times (such as once per week). For example, if the document already includes marking indicating stale elements, the document can be rendered to a user with indications of stale elements without having to perform the processing to determine the stale elements when the document is checked out.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, while the examples in the figures and discussed above related to XML documents, the disclosure and claims herein expressly extend to content management systems that handle any suitable type of content, whether currently known or developed in the future.

What is claimed is:

1. An apparatus comprising:
at least one processor;
a memory coupled to the at least one processor;
a repository residing in the memory that includes a plurality of documents that each include a plurality of elements; and
a content management system residing in the memory and executed by the at least one processor, the content management system managing the plurality of documents in the repository, the content management system comprising:

a stale content indication mechanism that provides at least one indication in a document editor that displays a document in the repository of staleness of at least one element in the document according to a stale content policy that specifies at least one threshold that is used to determine whether elements in the document are more outdated than other elements in the repository, wherein the stale content policy includes a plurality of thresholds relating to:

number of references to an element in the repository;

percent of documents in the repository that use the element; and timestamp of when the element was last updated;

wherein the stale content policy specifies a plurality of staleness levels according to the plurality of thresholds, and further specifies whether an auto suggest mechanism may be triggered for each staleness level to present to a user possible alternatives for at least one stale element in the document.

2. The apparatus of claim 1 further comprising an auto suggest mechanism that populates a query from metadata of a stale element and an autOouggest policy, executes the query and populates a similar element list from results of the query.

3. The apparatus of claim 2 wherein the auto suggest policy specifies additional criteria that the similar element list must satisfy.

4. The apparatus of claim 2 wherein if a similar element is selected from the similar element list, a first link to a stale element is replaced with a second link to the selected similar element.

5. A computer-implemented method for a content management system that manages a plurality of documents in a repository to indicate reusability of at least one element in a document, the method comprising the steps of:

defining a stale content policy that specifies at least one threshold that is used to determine whether elements in the document are more outdated than other elements in the repository, wherein the stale content policy includes a plurality of thresholds relating to:

number of references to an element in the repository;

percent of documents in the repository that use the element; and timestamp of when the element was last updated;

wherein the stale content policy specifies a plurality of staleness levels according to the plurality of thresholds, and further specifies whether an auto suggest mechanism may be triggered for each staleness level to present to a user possible alternatives for at least one stale element in the document; and providing at least one indication in a document editor that displays the document of staleness of at least one element in the document according to the stale content policy.

6. The method of claim 5 further comprising the steps of:

populating a query based on metadata from a stale element and an auto suggest policy;

executing the query; and populating a similar element list with results from the query.

7. The method of claim 6 wherein the auto suggest policy specifies additional criteria that the similar element list must satisfy.

8. The method of claim 6 wherein if a similar element is selected from the similar element list, performing the step of replacing a first link to a stale element with a second link to the selected similar element.

9. A computer-implemented method for a content management system that manages a plurality of documents in a repository to indicate reusability of elements in a document and automatically suggest similar elements in the repository for stale elements, the method comprising the steps of:

defining a stale content policy that specifies at least one threshold that is used to determine whether elements in the document are more outdated than other elements in the repository, wherein the stale content policy includes a plurality of thresholds relating to:

number of references to an element in the repository;

percent of documents in the repository that use the element; and timestamp of when the element was last updated;

wherein the stale content policy specifies a plurality of staleness levels according to the plurality of thresholds, and further specifies whether an auto suggest mechanism may be triggered for each staleness level to present to a user possible alternatives for at least one stale element in the document; and providing at least one indication in a document editor that displays the document of staleness of at least one element in the document according to the stale content policy;

defining an auto suggest policy that specifies criteria for including elements in a similar elements list;

receiving a request for a document in the repository;

packaging and sending the document, the related stale content policy, and the auto suggest policy to an editor;

the editor providing a visual indication for stale elements in the document as defined by the stale content policy;

if there are elements in the document that are stale according to the stale content policy, performing the steps of:

populating a query from metadata of a stale element and the auto suggest policy;

executing the query;

populating the similar elements list with results from the query according to the auto suggest policy;

displaying the similar elements list to a user;

receiving a selection from the user of a similar element in the similar elements list; and replacing a first link to a stale element with a second link to the user- selected similar element.

10. An article of manufacture comprising:

(A) a content management system comprising:

a stale content indication mechanism that provides at least one indication in a document editor that displays a document in a repository managed by the content management system of staleness of at least one element in the document according to a stale content policy that specifies at least one threshold that is used to determine whether elements in the document are more outdated than other elements in the repository, wherein the stale content policy includes a plurality of thresholds relating to:

number of references to an element in the repository;

percent of documents in the repository that use the element; and timestamp of when the element was last updated;

wherein the stale content policy specifies a plurality of staleness levels according to the plurality of thresholds, and further specifies whether an auto suggest mechanism may be triggered for each staleness level to present to a user possible alternatives for at least one stale element in the document; and (B) non-transitory computer-readable media bearing the content management system.

11. The article of manufacture of claim 10 further comprising an auto suggest mechanism that populates a query from metadata of a stale element and an auto suggest policy, executes the query and populates a similar element list from results of the query.

12. The article of manufacture of claim 11 wherein the auto suggest policy specifies additional criteria that the similar element list must satisfy.

13. The article of manufacture of claim 11 wherein if a similar element is selected from the similar element list, a first link to a stale element is replaced with a second link to the selected similar element.

\* \* \* \* \*